United States Patent [19]
Whitton

[11] Patent Number: 5,290,365
[45] Date of Patent: Mar. 1, 1994

[54] METHOD FOR REMOVING COATINGS FROM METAL SUBSTRATES PRONE TO CORROSION OR DETERIORATION

[75] Inventor: Colin A. Whitton, Buckinghamshire, England

[73] Assignee: Brent Chemicals International PLC, Buckinghamshire, England

[21] Appl. No.: 918,654

[22] Filed: Jul. 24, 1992

[30] Foreign Application Priority Data

Jul. 24, 1991 [GB] United Kingdom ............... 9116004.4

[51] Int. Cl.⁵ .................................................. C09D 9/00
[52] U.S. Cl. ........................................ 134/38; 548/543
[58] Field of Search .......................................... 134/38

[56] References Cited

U.S. PATENT DOCUMENTS

| | | | |
|---|---|---|---|
| 3,673,099 | 6/1972 | Corby et al. ........................ | 252/156 |
| 4,276,186 | 6/1981 | Bakos et al. ........................ | 252/158 |
| 4,737,195 | 4/1988 | Carandang et al. ................. | 134/38 |
| 4,744,834 | 5/1988 | Haq ..................................... | 134/38 |
| 4,933,091 | 6/1990 | Geke et al. .......................... | 210/712 |

FOREIGN PATENT DOCUMENTS

| | | |
|---|---|---|
| 7401287 | 12/1987 | Australia . |
| 0105742 | 4/1984 | European Pat. Off. . |
| 0355763 | 2/1990 | European Pat. Off. . |
| 0389829 | 10/1990 | European Pat. Off. . |
| 8806640 | 9/1988 | PCT Int'l Appl. . |
| 1507472 | 4/1978 | United Kingdom . |

*Primary Examiner*—David B. Springer
*Attorney, Agent, or Firm*—Harris, Kern, Wallen & Tinsley

[57] ABSTRACT

The invention relates to a method for removing coatings, in particular, organic coatings from metal substrates which are easily corroded or discoloured: aluminimum, aluminium alloy, zinc or zinc alloy.

Previously known compositions for this purpose were based on methylene chloride which is environmentally undesirable. In contrast, this invention uses a composition which comprises strong alkali, a polyhydric alcohol or ether derivative thereof and a pyrollidone and/or a lactone. The preferred pyrollidone is N-methyl pyrollidone.

22 Claims, No Drawings

METHOD FOR REMOVING COATINGS FROM METAL SUBSTRATES PRONE TO CORROSION OR DETERIORATION

This invention relates to a method for removing coatings, in particular, organic coatings from metal substrates which are easily corroded or damaged. In particular, the invention is directed to the removal of organic coatings, especially paint, from substrates comprising aluminium, aluminium alloy, zinc or their alloys which can be damaged or discoloured by contact with, hot alkaline solutions.

Many paint removing compositions are known and to date, the most successful and most widely used compositions are based on methylene chloride. Whilst these compositions are effective, methylene chloride is toxic and current environmental considerations have resulted in its use becoming unfavourable.

N-methyl pyrrolidone (NMP) is also a known paint stripping compound. Generally it is used in combination with an alkanolamine. However, these compositions are disadvantageous when used for example, as a liquid composition in an immersion bath, as they are usually used at temperatures of at least 80° C. which are both energy inefficient and hazardous. Since the flash point of NMP is 95° C. and vapour pressure at 80° C. is approximately 20 mm, the volatility of NMP can be problematic in such processes. In EP 355763 a thickened water based paint removing composition is described which is pasted onto a coating to degrade the coating. The composition comprises NMP, aromatic hydrocarbon, glycol ether, alkanolamine and a cellulose thickener.

In addition, it is known to use strong alkalis for paint removal. In the so-called "rolling boil" process which is commonly known for removing paint coatings from steel, aqueous compositions comprising strong alkali are maintained at high temperatures to remove the paints or similar coatings from the substrates. For example, in U.S. Pat. No. 4737195 an activator is proposed for the alkaline composition. The activator comprises for example, an ethoxylated compound, NMP and a furfuryl compound. The paint stripping temperatures used by that process are above 95° C. and it is unfavourable to use such high temperatures with such strongly alkaline (over 30%) compositions. The chemical conditions which the paint is subjected to in such processes are extremely harsh and severe chemical attack of metals which are prone to corrosion takes place, so that this type of composition is unsuitable for metals which can be easily corroded.

It is known to use NMP based compositions of removing coatings in the manufacture of electrical goods such as cable assemblies, semi-conductor devices and integrated circuits. In U.S. Pat. No. 3673099 a method of stripping cured methylphenyl silicone and polyvinyl cinnamate resins in the manufacture of electrical apparatus is described. The substrate used in the examples is a laminate of a ceramic, titanium and gold. Compositions comprising a solvent of NMP and a solution of strong alkali are used as stripper compositions, optionally including additional solvents, ethylene glycol monoethyl ether being exemplified. There is however, no suggestion that such compositions would be useful for removal of organic coatings from metal substrates which are prone to corrosion.

A composition of NMP and strong alkali is disclosed as a paint stripping composition, in EP 105742 where a paste composition comprising alkali metal or alkali metal hydroxide, polyglycol or polyglycol monoalkylether and a compatible polar solvent which may be for example water, alcohol or NMP, is disclosed. The composition is said to contain the alkali metal salt of the polyglycol. This composition is used to remove paint coatings from a wide range of substrates such as sandstone, marble, wood, asphalt, concrete, canvas and metal. For each of these substrates with the exception of canvas, the paint removing composition was left in contact with the paint coating for at least one hour. Paint removal was then effected by scraping followed by scrubbing the excess paint material from the substrate. The compositions are primarily intended for use on stone and wood, although there is one example of its use on an unspecified metal substrate. There is no suggestion that the composition would be suitable for use on metals which are prone to corrosion.

Particular problems are encountered when trying to remove paint or similar coating compositions from corrodible metal substrates and there is still a need for a convenient, effective composition for removing coatings such as paint from metals which are prone to corrosion.

The present invention aims to provide such a convenient paint removal method for corrodible metal substrates.

A method in accordance with the present invention, for removing a coating from a substrate of aluminium, zinc or their alloys comprises contacting the coating with a stripping composition comprising a strong alkali; a polyhydric alcohol or ether derivative thereof; and, a pyrrolidone and/or a lactone.

The composition for use in the method comprises a strong alkali which is preferably an alkali having a pH of at least 11.0 which is preferably an alkali metal or most preferably, an alkali metal hydroxide; sodium hydroxide or potassium hydroxide are particularly preferred.

The amount of alkali metal ion in the composition is preferably at least 0.05 moles/kg of the composition and most preferably at least 0.1 moles/kg. Preferably the amount of alkali metal ion is no greater than 1 mole/kg and most preferably it is no greater than 0.5 moles/kg of the composition. The addition of greater quantities of alkali metal ion is of little significant advantage in terms of enhancing the performance of the composition.

The pyrrolidone and/or lactone may be provided by one, or mixtures of more than one of these compounds. Suitable lactones are for example, butyrolactone. Preferably, the pyrrolidone and/or lactone component is a N-alkyl pyrrolidone or N-substituted alkyl pyrrolidone in which the alkyl includes cycloalkyl and alkenyl and has from 1 to 6 preferably 1 to 3 carbon atoms. N-methyl pyrrolidone is particularly preferred.

In order to produce the most effective composition, preferably the pyrrolidone and/or lactone is present in an amount of at least 10%, preferably at least 30% and most preferably at least 40% by weight of the composition. Generally it is present in the composition in an amount up to 90%, preferably up to 80% and most preferably up to 75% by weight.

The alcohol or ether derivative may be monohydric such as benzyl alcohol or polyhydric alcohol or derivative which will act as a cosolvent in the composition to increase the solubility of the strong alkali in the composition. However, for safety reasons, preferably the alcohol or its derivative has a flash point of at least 90° C. and most preferably at least 95° C. Since polyhydric alcohols and their derivatives tend to have higher flash points, they are preferred. Preferred suitable alcohols are high flash point materials such as glycols or glycerols or glycol ethers, for example ethylene glycol, diethylene glycol, butyl carbitol, diethyleneglycol monobutylether and polyethylene glycol. Although alcohols such as butanol, isopropanol and methanol can be used in the composition to achieve the same technical effect as the alcohols listed above, their flash points are too low to be desirable in this type of paint stripping composition.

The most preferred alcohols are butyl carbitol diethylene glycol and mixtures thereof, in particular butyl carbitol is the preferred cosolvent, as it is one of the more effective cosolvents.

The composition is preferably substantially free from water, the water content being no greater than 5% and preferably below 2% by weight and most preferably below 1% by weight. In certain systems, water molecules can act as an activator because the small size of the molecule results in effective penetration of a coating. However, if a large amount of water is present in the composition, the system will be corrosive towards some of the substrates. This is particularly a problem when the substrate comprises aluminium or an aluminium alloy.

The stripping composition may include other additional ingredients, for example a surfactant can be included to aid penetration and improve rinsing of the treated substrate, as well as reducing the surface tension of the system. Phosphate ester surfactants are particularly preferred because it has been found that they also help to reduce the risk of corrosion of the substrate by the composition. One other suitable is for example, polyoxyethylene tridecyl ether phosphate.

Additionally, other cosolvents/surfactants can be included in the system, for example, the addition of ethoxylated alcohol in an amount of from 0.1 to 10% by weight of the composition, preferably from 0.5 to 5% by weight, has been found to improve the effectiveness of the stripping composition.

A stripping composition for use in the process of the present invention is prepared by mixing the components of the composition. This preparation can involve addition of the various components in any order but preferably, at least a portion of the alcohol or its derivative is first mixed with the strong alkali. The pyrrolidone and/or lactone is preferably added in a second step. The alkali can be added as an aqueous solution of a salt or in the form of an alkali metal. Preferably, the alkali is in the form of an alkali metal hydroxide. The alkali metal hydroxides may be added as a solid or as a concentrated aqueous solution.

It is important to consider the water content of the final composition when adding the strong alkali. Obviously, if the alkali is added as an aqueous solution, water is added to the composition and the water content of the composition should preferably be maintained below the levels specfied above, in order to avoid increased risk of corrosion to the metal substrate.

The composition is mixed by stirring until a substantially homogeneous solution is formed. Additional components may be added at any stage, preferably prior to or at the time of mixing, in order to ensure that a homogeneous composition results. When the composition is to be used in the form of a paste, preferably at least part of the thickening agent is added as the last component as this ensures that the active components can be easily mixed before the increased viscosity of the composition results in difficulty in stirring.

The process is useful for the removal of a large range of coating compositions. For example, paint coatings comprising polyurethane, alkyl/melamine or polyester based paints. The process can be used for removal of coatings which have been applied by various different methods and is particularly directed to the removal of polyester based paint compositions which have been applied by powder coating.

The substrates from which the coatings are to be removed may be any substrate comprising aluminium, zinc or their alloys which is prone to corrosion. The process is intended for use in removal of paint or other resin coatings from, for example, metallic structural articles including door and window frames and various industrial/domestic articles such as boilers, refrigerators. The process is also suitable for use in some areas of the aircraft industry, for removing paint from the body work of aeroplanes.

Preferably the paint removal composition is provided in a liquid form and the coating is contacted with the stripping composition by an immersion process, by immersion of the coated substrate article into a bath of the stripping composition. Alternatively, the composition can be provided as a paste, by the addition of a thickening agent such as a bentonite clay, silica or cellulosic thickening agent, for example, hydroxymethyl cellulose. When the composition is provided as a thickened composition, the contact of the coating with the stripping composition can be by application of the paste to the coating.

The stripping composition can be contacted with the coating at a temperature of from room temperature upwards. In particular, using the preferred system of an immersion bath, lower temperatures than the conventional immersion bath temperatures can be used to give effective paint stripping. Generally the temperature is no greater than 60° C. preferably no greater than 40° C. and most preferably no greater than 35° C. Generally, the temperature will be at least 20° C.

When the stripping composition is applied by the preferred immersion process, since the composition may be somewhat volatile at elevated temperatures, preferably a layer of non-volatile oil having a lower density than the stripping composition is placed in the immersion bath so that an oil-seal is formed on the surface of the liquid. This reduces evaporation of the volatile components from the composition. Such an oil-seal is particularly useful when the process is to be carried out at temperatures substantially above room temperature, for example, if the temperature is to be increased to above 60° C.

Also, the oil seal may be particularly advantageous if it is used in a damp atmosphere as it can also prevent entry of water into the composition. Suitable oils for forming such an oil-seal are low viscosity mineral oils having flash points generally above 90° C. preferably above 95° C. such as "Edelex" (Trademark) oils available from shell, or high flash point paraffin oils.

When an oil seal is provided and surfactant is included in the stripping composition, the amount of surfactant must not be so great that the oil seal is broken.

The time of contact of the coating and substrate depends upon the thickness of the coating and the particular components and their amounts in the stripping composition. The time taken to remove a coating may be from as low as 2 minutes up to, for example, 2 hours, but generally the time taken to digest the coating will be up to 45 minutes, most often around 30 minutes.

Using the preferred system of an immersion bath, as various articles are immersed in the bath and more paint or other coatings are digested, the various components in the stripping composition will become exhausted at varying rates. As this occurs, in order to achieve the maximum effectiveness of the process, the temperature of the immersion bath may be raised slightly to accommodate for the reduction in strength of the composition.

When the activity of the composition has fallen below an effective level, it may be replenished with a replenishing composition. The replenishing composition will generally comprise a greater relative quantity of pyrrolidone and/or lactone with alkali, than the alcohol or ether derivative component. This is because the pyrrolidone and/or lactone as the solvent for the paint coating, can be depleted along with the alkali acting as its activator. Thus, a typical composition for a replenishing solution will be from 30 to 50% pyrrolidone and/or lactone, from 0.8 to 1.8 moles/kg of strong alkali and from 43 to 66% by weight alcohol or its ether derivative. Alternatively, the replenishing composition can be split into two or more parts, and each parts, and each part added separately; preferably one comprising the alcohol and alkali additive and the other primarily the NMP.

Following immersion of the coated substrate in a bath of the stripping composition, the coating is digested by the stripping composition and preferably, the substrate is given one or more rinses using water or aqueous solutions containing surfactant before being dried. Rinsing usually takes place by immersion and/or spraying from room temperature to 80° C. Drying usually takes place by air blasting or oven, generally from room temperature to 120° C.

EXAMPLE 1

| N-methyl pyrrolidine | 400 parts by weight |
| butyl carbitol | 290 parts by weight |
| diethylene glycol | 290 parts by weight |
| potassium hydroxide (flake) | 20 parts by weight | by firstly mixing the alcohols and the potassium hydroxide and mixing until a substantially homogeneous mixture is formed and subsequently mixing in the N-methyl pyrrolidone.

The resulting composition was placed in an immersion bath and an oil seal was included in the bath comprising 150 parts by weight of pale oil (flash point 146° C.). Aluminium window frames having a coating of powder coated polyester paint were immersed in the bath at 50° C. and the paint coating was digested in 15 minutes. The test was repeated at a temperature of 25° C. but with no oil seal, as this was unnecessary at such a low temperature, and the paint coating was removed in 30 minutes. After removal of the aluminium window frames from the immersion bath, rapid rinsing with water followed by air blast at ambient temperature produced aluminium window frames with the paint coating removed and with no visible corrosion. The test was repeated using zinc coated steel sections from domestic appliances, coated with polyester powder. At 25° C., the removal was complete in 20 minutes, and at 50° C. in 6 minutes, with no visible corrosion of the substrate.

EXAMPLE 2

A composition was prepared using the preparation process described in example 1, the composition comprising:

| N-methyl pyrrolidone | 80 parts by weight |
| Butyl carbitol | 18 parts by weight |
| Potassium hydroxide (flake) | 2 parts by weight |

The paint composition was placed in an immersion bath and an oil seal was provided as in Example 1. Aluminium window frames having a coating of powder coated polyester based paint were immersed in the immersion bath for 15 minutes at 25° C. and the paint coating was digested to form a sludge in the bottom of an immersion bath. Raising the temperature to 50° C. resulted in 9 minutes for complete digestion. The aluminium window frames were rapidly rinsed and dried as described in example 1. The paint coating had been removed and no visible corrosion resulted on the aluminium substrate. The test was repeated with zinc coated sections similar to those used in Example 1. At 25° C., the removal was complete in 3 minutes with no visible corrosion of the substrate.

I claim:

1. A method for removing a coating from a substrate of aluminium, zinc or their alloys comprising contacting the coated substrate comprising zinc, aluminum and/or their alloys with a stripping composition comprising at a temperature no greater than 60° C., the stripping composition comprising a strong alkali; a monohydric or polyhydric alcohol or ether derivative thereof; and, a 2-pyrrolidone and/or a butyrolactone.

2. A method according to claim in which the strong alkali is an alkali metal or alkali metal hydroxide.

3. A method according to claim 2 in which the amount of alkali metal ion in the composition is from 0.05 moles/kg to 1 mole/kg.

4. A method according to claim 3 in which the amount of alkali metal ion in the composition is from 0.1 to 0.5 mole/kg.

5. A method according to claim 1 in which the pyrrolidone and/or lactone component is selected from N-methyl 2-pyrrolidone and N-substituted alkyl 2-pyrrolidone in which alkyl includes cycloalkyl and alkenyl, the alkyl group having from 1 to 6 carbon atoms.

6. A method according to claim 5 in which the pyrrolidone and/or butyrolactone component comprises N-methyl 2-pyrrolidone.

7. A method according to claim 1 in which the amount of 2-pyrrolidone and/or butyrolactone in the composition is from 30 to 80% by weight.

8. A method according to claim 1 in which the alcohol or ether derivative is a cosolvent for the strong alkali 9. A method according to any preceding claim in which the alcohol or its derivative has a flash point of at least 90° C.

10. A method according to claim 1 in which the alcohol is one or more selected from ethylene glycol, diethylene glycol, butyl carbitol, diethylene glycol monobutylether and polyethylene glycol.

11. A method according to claim 10 in which the alcohol is butyl carbitol.

12. A method according to claim in which the water content of the composition is no greater than 2% by weight.

13. A method according to any preceding claim in which the composition additionally comprises a surfactant selected from phosphate esters and polyoxyethylene tridecyl ether phosphate.

14. A method according to claim 1 in which the composition additionally comprises from 0.to 10%, by weight ethoxylated alcohol.

15. A method according to claim 1 in which the composition additionally comprises a thickening agent and is applied to the coating in the form of a paste.

16. A method according to claim 1 in which the composition is contacted with the coated metal surface by immersion in a bath of stripping composition at a temperature no greater than 40° C.

17. A method according to claim 14 in which an oil-seal comprising a layer of non-volatile oil is present on the surface of the composition.

18. A method according to claim 1 in which after contact of the coating with the stripping composition, the substrate is rinsed using water or an aqueous solution containing surfactant and subsequently dried at a temperature of from room temperature to 120° C.

19. A method according to claim 1 in which the coating for removal comprises polyurethane, alkyl/melamine or polyester based paint.

20. A method of preparation of a composition according to claim 1 in which the strong alkali is an alkali metal hydroxide and at least a portion of the alcohol or its derivative is first mixed with the strong alkali followed by a second stage in which 2-pyrrolidone and/or butyrolactone is added to the mixture.

21. A replenishing composition for use in a method according to claim 1 comprising from 30 to 50% pyrrolidine and/or lactone, from 0.8 to 18 moles/kg strong alkali and from 43 to 66% by weight alcohol or its ether derivative.

22. Use of a stripping composition comprising a strong alkali, a monohydric or polyhydric alcohol or ether derivative thereof and a 2-pyrrolidone and/or a butyrolactone for removing a coating from a substrate of aluminium, zinc or their alloys at a temperature no greater than 60° C.

* * * * *